(12) United States Patent
Bouchard et al.

(10) Patent No.: US 12,294,413 B2
(45) Date of Patent: May 6, 2025

(54) ULTRAFAST TEMPORAL FILTERING FOR QUANTUM COMMUNICATIONS

(71) Applicant: National Research Council of Canada, Ottawa (CA)

(72) Inventors: Frédéric Bouchard, Gatineau (CA); Duncan England, Ottawa (CA); Philip J. Bustard, Ottawa (CA); Khabat Heshami, Ottawa (CA); Benjamin Sussman, Ottawa (CA)

(73) Assignee: NATIONAL RESEARCH COUNCIL OF CANA, Ottawa (CA)

( * ) Notice: Subject to any disclaimer, the term of this patent is extended or adjusted under 35 U.S.C. 154(b) by 65 days.

(21) Appl. No.: 17/927,829

(22) PCT Filed: May 20, 2021

(86) PCT No.: PCT/CA2021/050686
§ 371 (c)(1),
(2) Date: Nov. 25, 2022

(87) PCT Pub. No.: WO2021/237340
PCT Pub. Date: Dec. 2, 2021

(65) Prior Publication Data
US 2023/0208532 A1    Jun. 29, 2023

Related U.S. Application Data

(60) Provisional application No. 63/029,987, filed on May 26, 2020.

(51) Int. Cl.
*H04B 10/70*    (2013.01)

(52) U.S. Cl.
CPC .................................. *H04B 10/70* (2013.01)

(58) Field of Classification Search
None
See application file for complete search history.

(56) References Cited

U.S. PATENT DOCUMENTS

| 7,003,180 B2 | 2/2006 | Richardson et al. |
| 7,106,972 B2 | 9/2006 | Alfano et al. |

(Continued)

FOREIGN PATENT DOCUMENTS

| CN | 107014495 A | 8/2017 |
| CN | 104897530 B | 3/2018 |
| CN | 108667528 A | 10/2018 |

OTHER PUBLICATIONS

International Search Report issued in International Application No. PCT/CA2021/050686, Aug. 5, 2021, 3 pages.

(Continued)

*Primary Examiner* — David W Lambert
(74) *Attorney, Agent, or Firm* — Aird & McBurney LP

(57) ABSTRACT

A quantum communication method comprising: at a sender, preparing photons encoded in a single spatial, spectral, and temporal (SST) mode to form a quantum signal; and introducing the quantum signal into a quantum channel; at a receiver, a detector and filtering system optically processing the quantum signal and rejecting background noise photons in the quantum channel, and performing active temporal filtering by switching the polarization of the quantum signal without substantially adding noise; and wherein the active temporal filtering minimizes saturation of the detector.

22 Claims, 5 Drawing Sheets

(56) References Cited

U.S. PATENT DOCUMENTS

| | | |
|---|---|---|
| 9,036,817 B1 | 5/2015 | Hunt et al. |
| 10,425,708 B2 | 9/2019 | Kanter |
| 2015/0372768 A1 | 12/2015 | Dynes et al. |
| 2018/0149476 A1 | 5/2018 | Huang |
| 2018/0179476 A1 | 6/2018 | Pasin et al. |
| 2019/0379463 A1* | 12/2019 | Shields ................ H04L 9/0852 |

OTHER PUBLICATIONS

Written Opinion of the International Searching Authority issued in International Application No. PCT/CA2021/050686, Aug. 5, 2021, 5 pages.

Kupchak, C., et al. "Terahertz-bandwidth switching of heralded single photons." Optics Letters 44.6 (2019):1427-1430.

Kupchak, C., et al. "Time-bin-to-polarization conversion of ultrafast photonic qubits." Physical Review A 96.5 (2017):053812.

Liao, S.-K., et al. "Long-distance free-space quantum key distribution in daylight towards inter-satellite communication." Nature Photonics 11.8 (2017): 509-513.

Extended European Search Report issued in counterpart European Patent Application No. 21814502.7, mailed on May 28, 2024, 13 pages.

Raymer, M. G. & Walmsley, I.A. "Temporal modes in quantum optics: then and now." Physica Scripta 95.6 (2020): 064002.

Kupko, T., et al. "Tools for the performance optimization of single-photon quantum key distribution." Arxiv.org, Cornell University Library, 201 Olin Library Cornell University Ithaca, NY 14853 (2019), XP081579652.

* cited by examiner

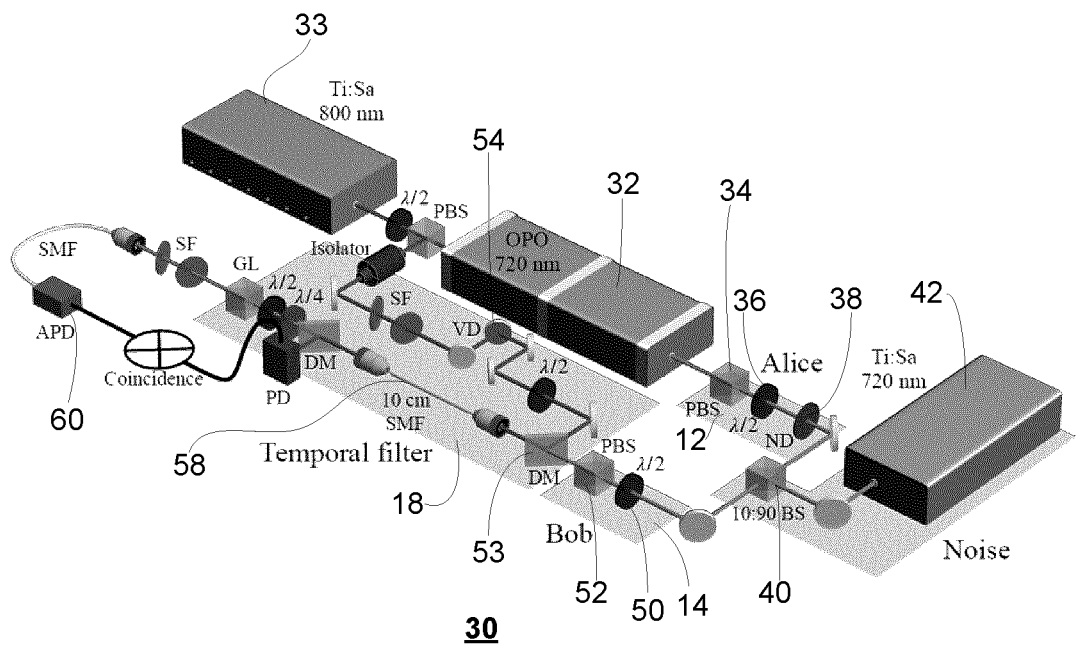
Figure 2a
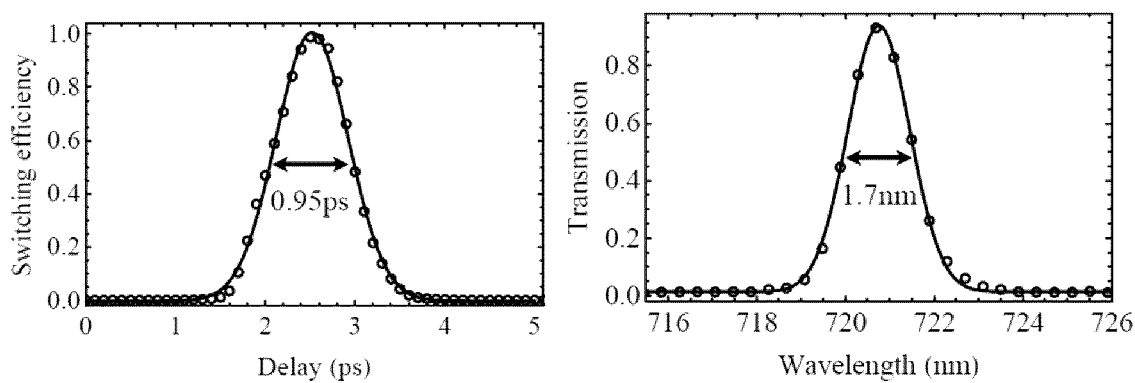
Figure 2b
Figure 2c

ULTRAFAST TEMPORAL FILTERING FOR QUANTUM COMMUNICATIONS

FIELD

Aspects of the disclosure relate to a quantum communication system.

BACKGROUND

Quantum communication protocols, such as quantum key distribution (QKD), are based on the distribution of entangled photons, or pulses of single photons, throughout an untrusted quantum channel. Quantum key distribution is a technique which results in the sharing of cryptographic keys between two parties: a transmitter often referred to as "Alice"; and a receiver often referred to as "Bob". In realistic implementations, the quantum channel presents several important challenges such as the presence of loss and noise which degrades the quantum states of the photons propagating through it. For instance, noise ultimately limits the maximal achievable distances and secret key rates in quantum communications. In particular, the operation of quantum communication in extremely noisy environments is becoming even more crucial with the advent of quantum communication with satellites requiring operation in daylight conditions or the development of the quantum internet in existing bright fibre networks.

Several approaches have been proposed to limit the impact of noise in quantum communications. For example, incremental technological advancements on the single photon source and the single photon detectors have resulted in larger source rates and lower dark count detection rates, which increase the signal-to-noise ratio and minimize the impact of noise. Another approach consists in a change of software by considering quantum protocols that are intrinsically more noise tolerant, e.g. tomographic and high-dimensional protocols. However, a change in quantum protocol typically results in a minor improvement in noise tolerance. Yet another approach involves noise filtering, where spectral, timing and spatial filters may be applied using passive or active schemes.

At present, the temporal filtering of the quantum signal is limited by the electronics of the single photon detectors. In particular, the jitter of the detectors dictates the minimal temporal filtering that can be applied to the signal (typically on the order of nanoseconds). In addition, spectral filtering can be employed with a high efficiency using interference filters (typically on the order of nanometers). However, if one were to use Fourier-limited single photon pulses, for a bandwidth of 1 nm, a pulse with a duration of 1 ps can be expected in the near-infrared region.

Spectral filtering is commonly employed in QKD using interference filters with bandwidths on the order of a few nanometers. Other techniques may achieve narrower bandwidths, but typically presents certain limitations. On the other hand, time filtering can also be jointly employed with the help of fast detectors and time tagging devices, where gating times are limited by the timing jitter of the single photon detectors, typically on the order of nanoseconds, and all other electronic devices involved. With the recent development of superconducting nanowire single photon detectors, a significant improvement in timing jitters can be achieved, i.e. as low as 50 ps. Unfortunately, these detectors require cryogenic cooling (approximately 1 K). Finally, despite time gating being an effective way to limit the amount of noise introduced in the detection event, noise counts may have another undesired effect, i.e. to limit the overall signal detection rate due to detector dead time and detector saturation.

It is an object of the present disclosure to mitigate or obviate at least one of the above-mentioned disadvantages.

SUMMARY

In one of its aspects, there is provided a quantum communication method comprising:
  at a sender, preparing photons encoded in a single spatial, spectral, and temporal (SST) mode to form a quantum signal; and introducing the quantum signal into a quantum channel;
  at a receiver, a detector and filtering system optically processing the quantum
signal and rejecting background noise photons in the quantum channel, and performing active temporal filtering by switching the polarization of the quantum signal without substantially adding noise; and wherein the active temporal filtering minimizes saturation of the detector.

In another of its aspects, there is provided a quantum communication system comprising:
  a sender comprising a quantum signal source and a quantum signal encoder;
  a transmission medium;
  a receiver comprising an active temporal filter and a single photon detector.

In another of its aspects, there is provided an active temporal filter comprising:
  a system optically processing a quantum signal and rejecting background noise photons in a quantum channel; operating by
  a switch comprising a switching efficiency, $\eta$, of the quantum signal, wherein the switching efficiency is dependent on at least the nonlinear refractive index of the single mode fibre and the length of the single mode fibre.

Advantageously, one aspect of the disclosure teaches increasing the overall performance of quantum key distribution in noisy environments by employing a temporal filtering scheme prior to a single photon detector. An ultrafast, active optical switch achieves temporal filtering which allows quantum key distribution in noisy environments by switching the polarization of quantum optical signals without substantially adding noise. The switch matches the shortest possible gate time allowed for quantum signals with a bandwidth on the order of 1 nm. The wavelength of the control and signal pulses is selected in such a way to limit the amount of noise originating from the presence of the strong control-pulse into the spectral window of the signal pulse. In addition, the disclosed technique uses broadband and Fourier-limited quantum signals to maximize spectral and temporal degree of freedom in quantum communication. The technique is compatible with passive spatial and spectral filtering and offers orders of magnitude additional improvement.

BRIEF DESCRIPTION OF THE DRAWINGS

Several exemplary embodiments of the present disclosure will now be described, by way of example only, with reference to the appended drawings in which.

FIG. 2a shows an experimental setup demonstrating the use of an active temporal filter in the quantum communication system;

FIG. 2b depicts a temporal profile of the active temporal filter illustrating switching efficiency as a function of the pump delay;

FIG. 2c show a spectrum of signal photons after spectral filtering at a receiver stage;

DETAILED DESCRIPTION OF EXEMPLARY EMBODIMENTS

Figure 1A:
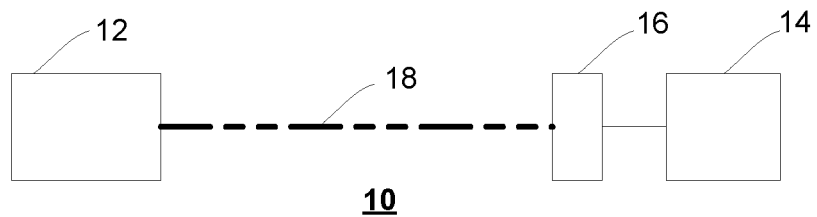
FIG. 1a shows a top-level component architecture diagram for a quantum communication system.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Referring to FIG. 1a, there is shown a top-level component architecture diagram for a quantum communication system, generally depicted by reference numeral 10. Quantum communication system 10 comprises sender 12 which transmits information to receiver 14 by encoded single quanta, such as single photons via quantum channel 16. Generally, each photon carries one bit of information encoded upon a property of the photon, such as its polarization, phase or energy/time. The photon may even carry more than one bit of information, for example, by using properties such as angular momentum. Quantum channel 16 may be a communication link between transmitter 12 and receiver 14, and quantum channel 16 may be in the form of an optical fibre link, underwater links, free space, air, or any combination thereof.

Sender 12 comprises suitable light source and encoder; and receiver 14 comprises quantum receiver with one or more detectors configured to detect quantum signals. Positioned before receiver 14 is active temporal filter 18 configured to substantially minimize background noise photons in quantum channel 16, such that the signal to noise ratio at receiver 14 is greatly increased.

Figure 1B:
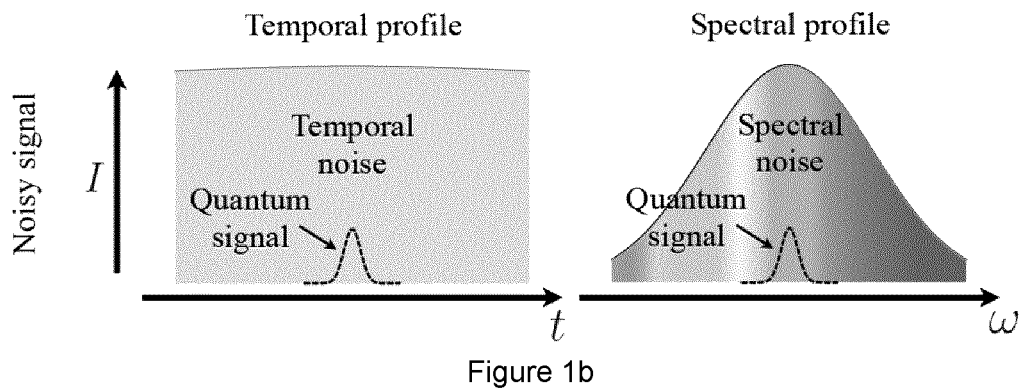
FIG. 1b shows a temporal profile and a spectral profile of a noisy signal.
Figure 1C:
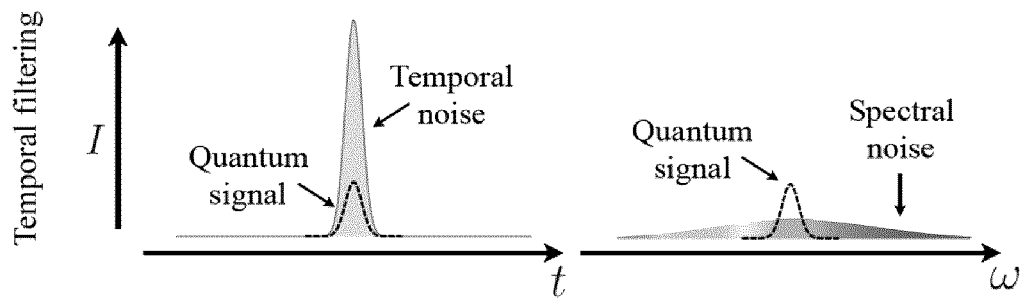
FIG. 1c shows a temporal profile and a spectral profile of a noisy signal following temporal filtering.
Figure 1D:
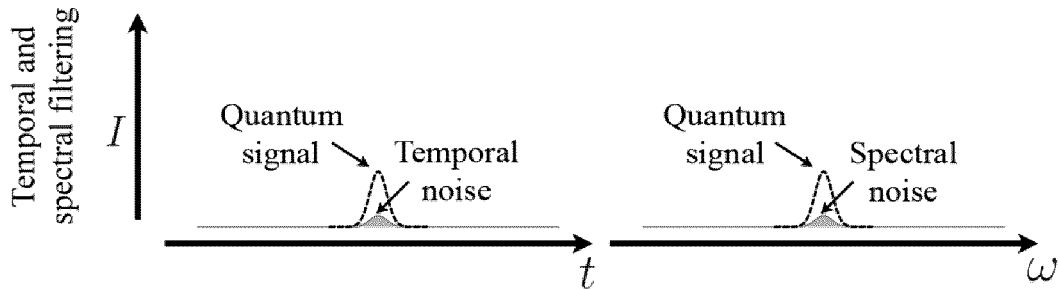
FIG. 1d shows a temporal profile and a spectral profile of a noisy signal following active temporal filtering.

Active temporal filter 18 employs an active switching technique to achieve a filter whose gate times represent a substantial improvement compared to electronic filtering techniques. In one example, the active filter comprises gate times in the range of 50 fs to 100 ps. Furthermore, the active the active switching technique can result in a substantial improvement in noise tolerance over an electronic filter, and such improvements daytime enable satellite quantum key distribution or quantum communication in bright fibers. In one example, active time filtering achieves an improvement in noise tolerance noise tolerance by a factor of up to 2000 compared to a 2 ns electronic filter. For the sake of comparison, FIG. 1b shows a temporal profile and a spectral profile of a noisy signal; FIG. 1c shows a temporal profile and a spectral profile of a noisy signal following temporal filtering; and FIG. 1d shows a temporal profile and a spectral profile of a noisy signal following active temporal filtering.

Figure 1E:
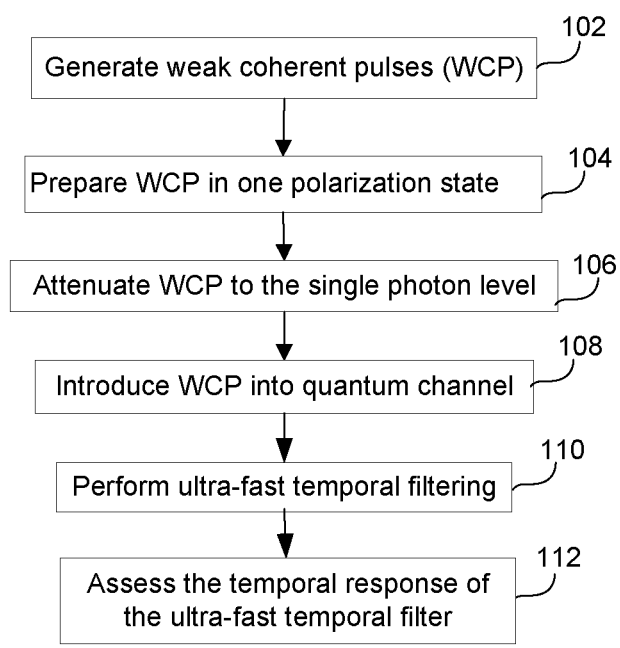
FIG. 1e shows a flowchart outlining exemplary steps for implementing active temporal filtering.

Looking at FIG. 1e, there is shown flowchart 100 outlining exemplary steps for implementing active temporal filtering. In one implementation, as shown in FIG. 2a, experimental quantum communication system 30 was set up to demonstrate active temporal filtering. Experimental quantum communication system 30 employed a polarization-based decoy state BB84 protocol where noise was intentionally introduced in quantum channel 18 to determine the noise tolerance of quantum communication system 30 using active temporal filter 18. The process starts by generating weak coherent pulses (WCP) prepared by attenuating short pulses at a center wavelength of $\lambda_{signal}$=720:8 nm, step 102. The weak coherent pulses are obtained from an optical parametric oscillator 32 pumped by titanium-sapphire (Ti:Sa) laser 33 with a repetition rate of $f_{rep}$=80 MHz. In step 104, using polarizing beam splitter (PBS) 34 and half-wave plate (HWP) 36, the polarization state of the weak coherent pulses is prepared at Alice's stage or sender 12. According to the standard polarization BB84 protocol, sender 12 randomly prepares the weak coherent pulses in one of four polarization states, i.e. horizontal, vertical, diagonal and anti-diagonal. In step 106, the weak coherent pulses are then attenuated to the single photon level by using neutral density (ND) filter 38 and half-wave plate 36 prior to polarizing beam splitter 34. Next, using half-wave plate 36, the mean photon number of the weak coherent pulses prepared by sender 12 is randomly set to μ, v, and 0, corresponding respectively to the signal, decoy, and vacuum pulses for the decoy state protocol. The values of μ and v, are varied for different values of channel noise and loss, and subsequently selected offline to optimize the overall secret key rate for each channel condition.

In step 108, the weak coherent pulses are then sent through quantum channel 18, where a 10:90 (reflection: transmission) beam splitter 40 is used to introduce channel noise. The noise is produced by second Ti:Sa oscillator 42 operated in continuous-wave mode with a center wavelength and linewidth of $\lambda_{CW}$=720:7 nm and $\Delta\lambda_{CW}$=0:83 nm. The amount of noise introduced in channel 18 is controlled using a combination of half-wave plate, polarizing beam splitter and neutral density filter. The polarization of the noise source 42 is randomly varied using an additional half-wave plate. In step 110, the incoming photons are then sent through Bob's detection stage, receiver 14, where the polarization is analyzed using half-wave plate 50 and polarizing beam splitter 52, and then through active temporal filter 18. Using dichroic mirror (DM) 53 and variable delay (VD) stage 54, the signal is made to overlap with a synchronized pump pulse at a center wavelength of $\lambda_{pump}$=800 nm generated by Ti:Sa oscillator or pump 33, by coupling both into a 10 cm-long single mode fibre 58 with coupling efficiencies of 50% and 65%, for the signal and pump 33 respectively. The switching efficiency, $\eta$, of the quantum signal is given by $$\eta = \sin^2(2\theta)\sin^2\left(\frac{\Delta\phi}{2}\right), \quad (1)$$

where $\theta$, is the angle between the polarization of the signal and pump 33, $\Delta\phi=2\pi n_2 L_{eff} I_{pump}/\lambda_{WCP}$ is the non-linear phase shift induced by the pump single mode fibre 58, $n_2$ is the nonlinear refractive index of single mode fibre 58, $L_{eff}$ is the effective length of the single mode fiber, and $I_{pump}$ is the intensity of the pump pulse. Maximal switching efficiency is observed when $\theta=\pi/4$ and $\Delta\phi=\pi$. Thus, the polarization of the pump 33 is prepared to be at an angle of 45° to the polarization of the quantum signal at the input of single mode fibre 58. By taking advantage of the difference in group velocity between the quantum signal and the pump pulse inside single mode fibre 58, a uniform nonlinear phase shift is imprinted across the weak coherent pulses. In particular, the pulse duration of pump 33 and the length of single mode fibre 58 is selected to allow the pump pulse to fully traverse through the weak coherent pulses within the length of the single mode fibre 58. This is achieved by spectrally filtering pump 33 with a pair of angle-tuned bandpass filters such that $\Delta\lambda_{pump}$=2:1 nm. Finally, the average power of the pump pulse is set to 300 mW resulting in a unit switching efficiency.

Increasing the effective length of medium 58 and the pulse energy of pump 33 may lead to parasitic nonlinear processes such as self-phase modulation and two-photon absorption. These nonlinear processes may create noise photons covering the spectral range of interest for the quantum signals, and therefore the noise photons are appropriately accounted for. In the experimental setup, the unit switching efficiency is achieved by setting the pump pulse energy to 3.75 nJ. At this pulse energy, $1.6\times10^{-4}$ noise counts per pulse originating from pump 33 are detected in the single SST mode dedicated to the quantum signal. Avalanche photo-diode (APD) 60 is then used to detect the measured photons. Avalanche photo-diode 60 is electronically gated using pump 33 as a reference. The coincidence window is dictated by the timing jitter of avalanche photo-diode 60 and was set to $\Delta t_{coinc}$=2.0 ns. By doing so, a first layer of temporal filtering, or electronic temporal filtering, is achieved by reducing continuous noise by a factor of $f_{rep}\Delta t_{coinc}$=0.16. Finally, in step 112, the variable delay stage varying the time of arrival of the pump pulse with respect to the signal is scanned to assess the temporal response of active temporal filter 18, as shown in FIG. 2b. The full width at half maximum (FWHM) of the temporal trace is $\Delta t_{switch}$=0.95±0.01 ps with a switching efficiency of 99±1%. To confirm the experimental results, the temporal profile of active temporal filtering was simulated and the simulated results were in substantial agreement with active temporal filter 18 experimental results.

To assess the feasibility of the time filtering scheme in active quantum communication, a proof-of-principle QKD demonstration was performed, where the figure of merit was given by the secret key rate. In particular, different channel conditions in terms of noise and loss were investigated to demonstrate the different regimes where active quantum communication can offer a considerable advantage over electronic QKD settings. The secret key rate R was calculated using the standard decoy BB84 post-processing procedure, as is known in the art. The following formula was used for key generation:

$$R \geq q(-Q_\mu f(E_\mu) H_2(E_\mu) + Q_1[1-H_2(e_1)]), \quad (2)$$

where $q=\frac{1}{2}$ is the sifting efficiency, $Q_\mu$ is the gain of signal states, $f(x)$ is the error correction efficiency, $H_2(x)=-x \log_2(x)-(1-x)\log_2(1-x)$ is the binary Shannon entropy function, $E_\mu$ is the quantum bit error rate (QBER), $Q_1$ is the gain of single-photon states, and $e_1$ is the error rate of single-photon states. The experimentally measured gains and QBER, i.e. $Q_\mu$, $Q_\nu$ and $E_\mu$ of optimized mean photon numbers $\mu$ and $\nu$ for the signal and decoy states, respectively. The standard error correction efficiency factor of $f(E_\mu)$=1.22.

Figure 3A:
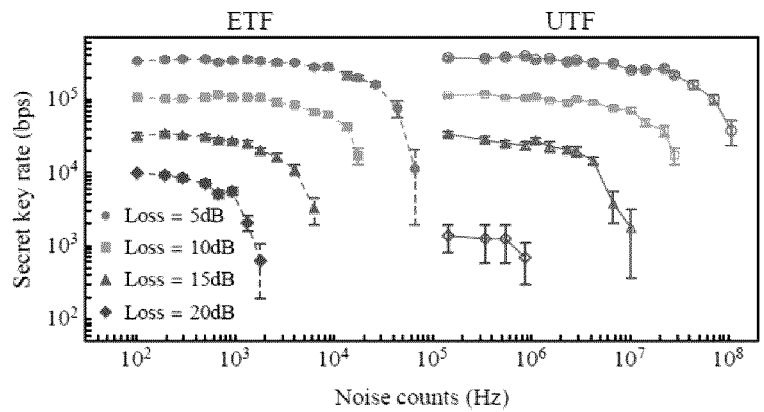
FIG. 3a shows secret key rates as a function of noise counts reported for different channel loss values: 5, 10, 15, and 20 dB.
Figure 3B:
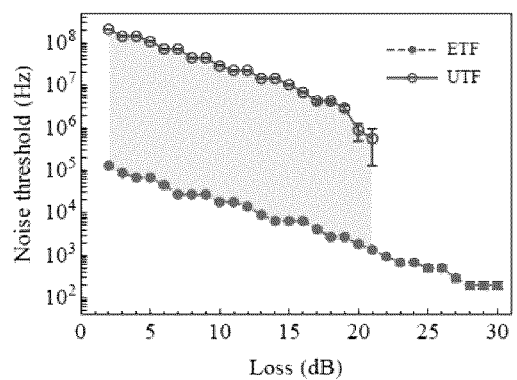
FIG. 3b shows a noise threshold for different values of channel loss.
Figure 3C:
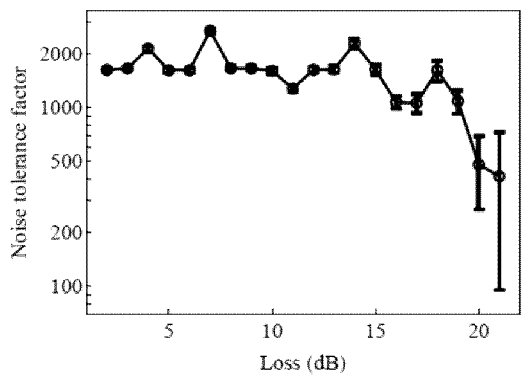
FIG. 3c shows a noise improvement factor corresponding to the ratio of the noise threshold for the case of active temporal filtering over electronic temporal filtering for different values of channel loss.
Figure 3D:
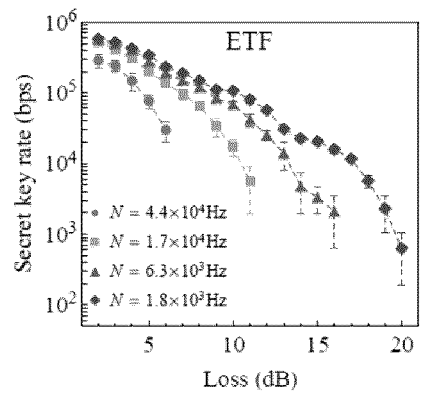
FIG. 3d shows secret rates as a function of channel loss.
Figure 3E:
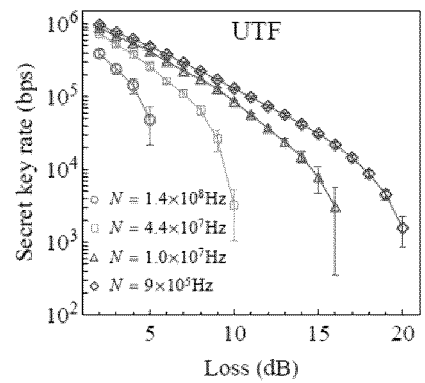
FIG. 3e shows active temporal filtering for different channel noise values, N.
Figure 3F:
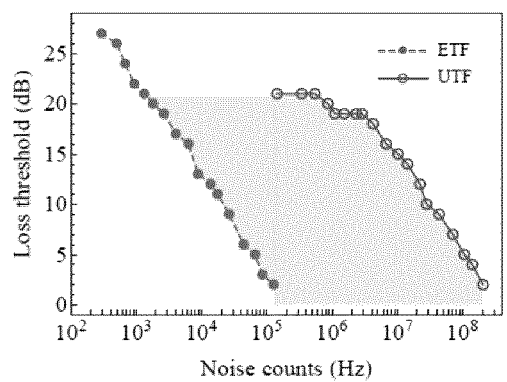
FIG. 3f shows loss threshold for different values of noise counts.
Figure 3G:
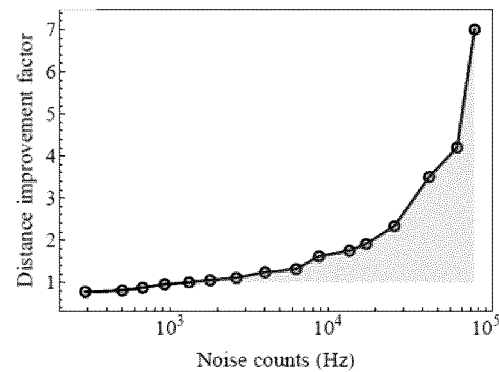
FIG. 3g shows distance improvement factor corresponding to the ratio of the loss threshold for the case of active temporal filtering over electronic temporal filtering for different values of noise counts.

Experimental results for the secret key rate, R, are shown in FIG. 3a comparing the case of electronic temporal filtering and active temporal filtering as a function of channel noise, N, for different values of channel loss. As can be seen, secret key rates can be achieved in a noise regime that is several orders of magnitude larger when operating with active temporal filtering (solid curves) compared to electronic temporal filtering (dashed curves). In particular, the noise threshold, i.e. maximal noise counts that result in a positive secret key rate R, for both temporal filtering schemes as a function of channel loss is compared, as shown in FIG. 3b. The noise threshold is defined as the largest amount of noise for which a positive secret key rate can still be achieved within a standard deviation. The noise tolerance factor, i.e. ratio of noise thresholds for the active temporal filtering to the electronic temporal filtering, is shown in FIG. 3c as a function of channel loss, where for certain loss levels, a noise improvement factor in excess of 2000 is obtained, which agrees with the values obtained from the simulation. These results can also be presented in the context of a second scenario where a fixed amount of noise is present in quantum channel 18, but different loss conditions are investigated. The secret key rates are shown as a function of channel loss, as shown FIGS. 3d and 3e for various noise counts, N. The maximal achievable channel loss can be assessed by considering the loss threshold, see FIG. 3f. An improvement in communication distance, i.e. distance improvement factor >1 occurs for noise counts starting from $1.3\times10^3$ Hz, see FIG. 3g. Moreover, a maximal distance improvement factor is achieved at a channel noise of $8.5\times10^4$ Hz with an improvement factor of 7. Since, active temporal filter 18 itself introduces small amounts of noise in the measured raw key, benefits are expected particularly in noisy environments. In FIGS. 3b, f and g, the shaded areas represent conditions where QKD cannot work with an electronic temporal filter, but works with active temporal filter 18. To extend the advantage region of active temporal filter 18, for instance beyond 21 dB of loss, different avenues can be employed to mitigate the effect of pump noise, e.g. pump pulse and SMF engineering. Hence, the reported pump noise is not a fundamental limitation of the active filtering scheme and we expect that lower values of pump noise can be envisaged with further design efforts. Finally, in the experimental setup, the signal wavelength, $\lambda_{signal}$, was set to approximately 720 nm. This choice was motivated by the available laser source and the desire for low pump noise, although other wavelengths are also suitable e.g. 1310 nm and 1550 nm. Active temporal filter 18 scheme may be applied to the highly desirable telecommunication wavelengths provided a proper design of single mode fibre 58 and pump 33 either using a polarization rotation switch or other switching schemes. Furthermore, active temporal filter 18 scheme may also improve the noise tolerance of continuous-variable QKD schemes, where noise and losses are problematic; and also minimizes saturation of the single photon detector.

When compared to other noise tolerant QKD schemes e.g. for the case of high-dimensional QKD protocol, active temporal filter 18 scheme involving single SST modes has the advantage in noise tolerance when a full high-dimensional analysis of multi-mode quantum signals is carried out compared to a coarse-grained two-dimensional analysis of the multi-mode signal. Furthermore, noise tolerance may be greatly enhanced when the signal is encoded and measured in a single SST mode, noise photons are substantially prevented from even entering the measurement apparatus in modes other than that used to communicate the quantum signals.

In one exemplary implementation, the transmission of a QKD signal is combined with the transmission of a classical optical signal, such that quantum channels co-exist with classical channels in a quantum communication system.

In one exemplary implementation, transmitter 12 is a transceiver.

In one exemplary implementation, receiver 14 is a transceiver.

It is noted that various example embodiments as described herein may be implemented in a wide variety of devices, network configurations and applications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems, and computer program products. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

The invention claimed is:

1. A quantum communication method comprising:
   at a sender, preparing photons encoded in a single spatial, spectral, and temporal (SST) mode to form a quantum signal; and introducing the quantum signal into a quantum channel;
   at a receiver, a detector and filtering system optically processing the quantum signal and rejecting background noise photons in the quantum channel, and performing active temporal filtering by switching the polarization of the quantum signal without substantially adding noise; and
   wherein the active temporal filtering minimizes saturation of the detector.

2. The method of claim 1, wherein the detected quantum signal is substantially weaker than the background noise photons, whereby noise tolerance is maximized without significantly altering the quantum signal.

3. The method of claim 2, wherein the photons are prepared for transmission via at least one of a fibre network to a receiver and a free space channel.

4. The method of claim 3, wherein the quantum communication protocol comprises quantum key distribution (QKD).

5. The method of claim 1, wherein the active temporal filtering comprises a gate time ranging between 50 fs and 100 ps.

6. The method of claim 2, wherein the active temporal filtering is based on cross-phase modulation via an optical Kerr effect in a single mode fibre.

7. The method of claim 1, wherein the active temporal filtering comprises a switching efficiency, n of the quantum signal, wherein the switching efficiency is dependent on at least the nonlinear refractive index of the single mode fibre and the length of the single mode fibre.

8. The method of claim 1, wherein the active temporal filtering improves the noise tolerance factor and improves the distance compared to electronic filtering techniques.

9. The method of claim 2, wherein the photons are prepared at the sender using a polarizing beam splitter and a half-wave plate according to a predetermined polarization protocol.

10. A quantum communication system comprising:
    a sender comprising a quantum signal source and a quantum signal encoder;
    a transmission medium;
    a receiver comprising an active ultrafast temporal filter, and a single photon detector, wherein the active ultrafast temporal filter comprises a gate time ranging between about 50 fs and about 100 ps.

11. The quantum communication system of claim 10, wherein the transmission medium is a quantum channel which introduces channel noise that will be filtered by the active ultrafast temporal filter.

12. The quantum communication system of claim 11, wherein photons are prepared in a single spatial, spectral, and temporal (SST) mode to form a quantum signal.

13. The quantum communication system of claim 12, wherein the active ultrafast temporal filter comprises an active switch of switching efficiency, η of the quantum signal.

14. The quantum communication system of claim 13, wherein the quantum channel comprises a fibre network.

15. The quantum communication system of claim 14, wherein the switching efficiency is dependent on the nonlinear refractive index of the single mode fibre and the length of the single mode fibre.

16. The quantum communication system of claim 13, wherein the quantum channel comprises free space.

17. An active ultrafast temporal filter comprising:
a system optically processing a quantum signal and rejecting background noise photons in a quantum channel; operating by
a switch comprising a switching efficiency, $\eta$, of the quantum signal, wherein the switching efficiency is dependent on at least the nonlinear refractive index of the single mode fibre and the length of the single mode fibre.

18. The active ultrafast temporal filter of claim 17, wherein the active ultrafast temporal filter achieves a substantial improvement in the noise tolerance factor compared to electronic filtering techniques.

19. The active ultrafast temporal filter of claim 17, wherein the active ultrafast temporal filter comprises a substantial improvement compared to electronic filtering techniques.

20. The active ultrafast temporal filter of claim 17, wherein the active temporal filtering comprises a substantial improvement in gate time compared to electronic filtering techniques.

21. The active ultrafast temporal filter of claim 17, wherein the active ultrafast temporal filter is based on cross-phase modulation via an optical Kerr effect in a single mode fibre.

22. The quantum communication system of claim 12, wherein the active ultrafast temporal filter comprises an active switch of switching efficiency, $\eta$ of the quantum signal.

* * * * *

UNITED STATES PATENT AND TRADEMARK OFFICE
CERTIFICATE OF CORRECTION

PATENT NO. : 12,294,413 B2
APPLICATION NO. : 17/927829
DATED : May 6, 2025
INVENTOR(S) : Frédéric Bouchard et al.

Page 1 of 1

It is certified that error appears in the above-identified patent and that said Letters Patent is hereby corrected as shown below:

On the Title Page

Item (73) Assignee: The Assignee name should be corrected to read "NATIONAL RESEARCH COUNCIL OF CANADA".

In the Claims

Claim 7, Line 36: "n" should be corrected to "η".

Signed and Sealed this
Nineteenth Day of August, 2025

Coke Morgan Stewart
*Acting Director of the United States Patent and Trademark Office*